L. E. ARMSTRONG.
TORPEDO TRAP OR GUARD.
APPLICATION FILED MAR. 29, 1917.
1,256,194.
Patented Feb. 12, 1918.
2 SHEETS—SHEET 2.
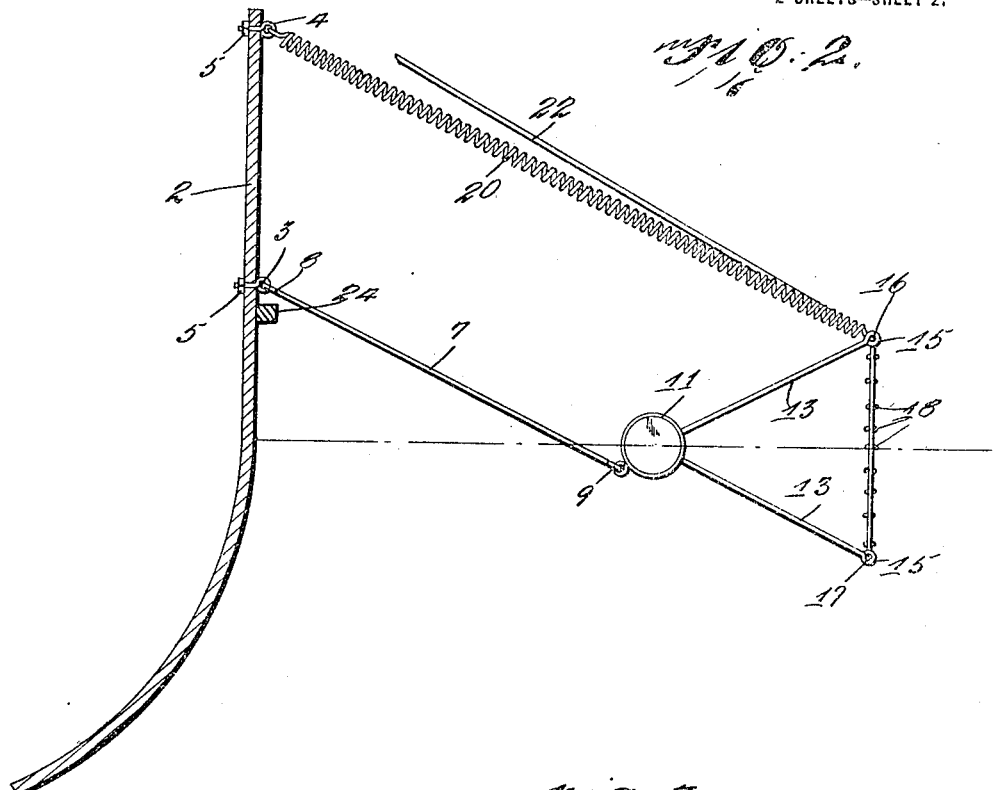
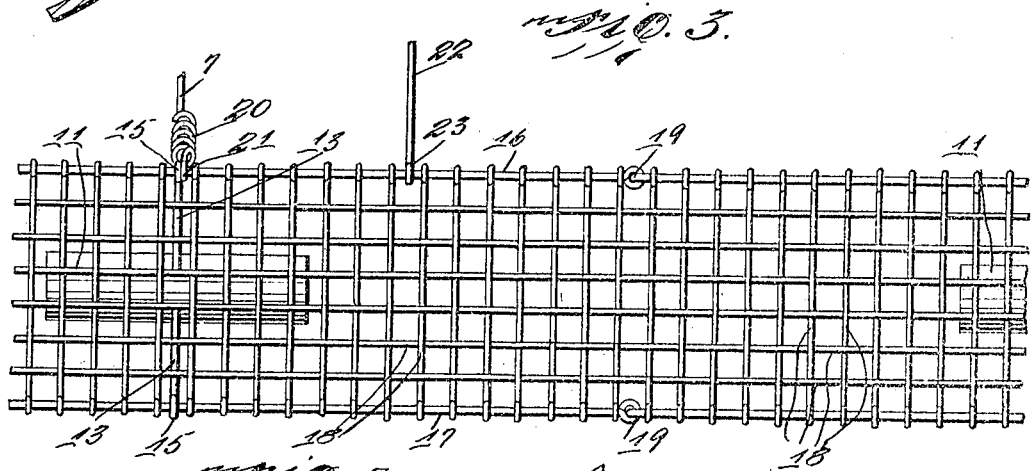
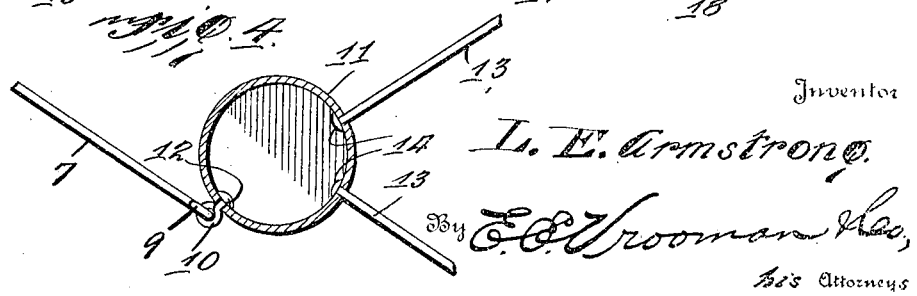
Inventor
L. E. Armstrong.
By E. E. Vrooman &co,
his Attorneys

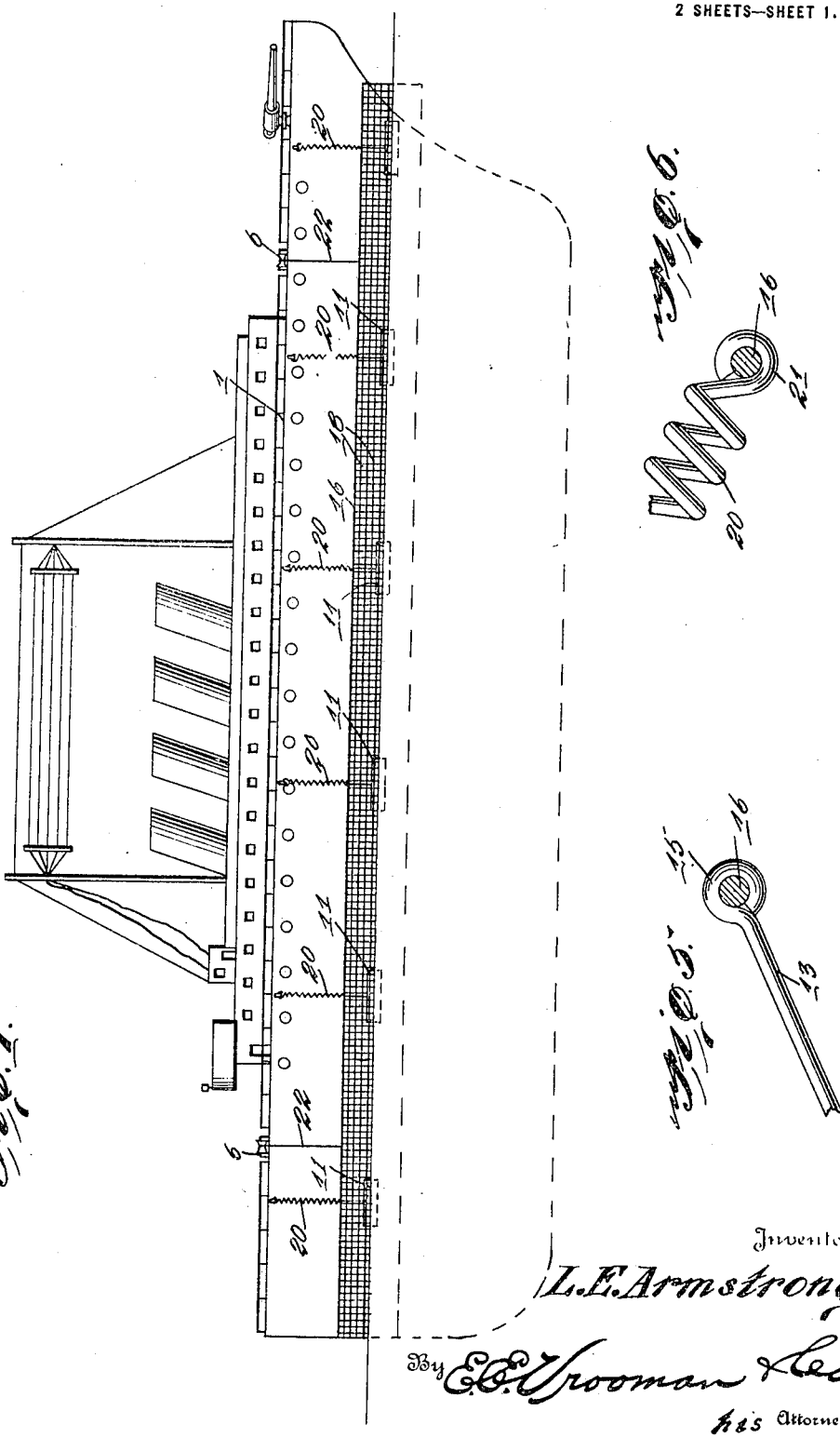

UNITED STATES PATENT OFFICE.

LOUIS EARL ARMSTRONG, OF OMAHA, NEBRASKA, ASSIGNOR OF ONE-HALF TO CHARLES MITCHELL, OF OMAHA, NEBRASKA.

TORPEDO TRAP OR GUARD.

1,256,194.

Specification of Letters Patent.

Patented Feb. 12, 1918.

Application filed March 29, 1917. Serial No. 158,339.

*To all whom it may concern:*

Be it known that I, LOUIS E. ARMSTRONG, a citizen of the United States of America, residing at Omaha, in the county of Douglas and State of Nebraska, have invented certain new and useful Improvements in Torpedo Traps or Guards, of which the following is a specification, reference being had therein to the accompanying drawing.

This invention relates to a torpedo trap and guard and has for its principal object the provision of a structure which is to be carried by a ship spaced from the sides of the hull so as to protect the ship from torpedo attacks.

Another object of this invention is the production of a torpedo guard wherein a net is yieldably supported at a spaced distance from the side of the ship so that when a torpedo engages the net the net may yield for reducing the possibility of an explosion of the torpedo.

Another object of this invention is the provision of a torpedo guard wherein the net is supported by a plurality of floats so as to be at all times adjacent the water line thus causing the torpedo directed toward the ship to come into engagement with the net.

Another object of this invention is the provision of a torpedo trap or guard provided with a net comprising a plurality of sections thus permitting the net to yield intermediate its ends as the floats of the net move upwardly or downwardly independently of each other whereby the net will be carried at all times adjacent the water line.

Another object of this invention is the production of a torpedo trap or guard which has a plurality of rods pivotally mounted upon the hull of the ship and connected to the tanks for supporting the tanks and the nets carried thereby spaced from the side of the ship while supporting springs are connected to the ship and the net for yieldingly retaining the net upon each side of the ship in a vertical plane.

Another object of this invention is the provision of a torpedo trap or guard wherein each float is provided with a plurality of diverging arms fixedly mounted thereon so as to permit these arms to support the side rods of a section of a net, thus holding the net in a vertical plane whereby the net will be in position to engage a torpedo directed toward the ship.

In the accompanying drawings:—

Figure 1 is a side elevation of a ship showing the torpedo trap or guard mounted in position thereon and in condition for use;

Fig. 2 is a transverse section through the net, portions of the structure being shown in elevation;

Fig. 3 is a front elevation of the net and tanks, portions of the supporting links and springs being shown broken away;

Fig. 4 is a transverse section through one of the floats illustrating the manner in which the arms and the link are connected thereto;

Fig. 5 is an elevation of the outer end of one of the supporting arms;

Fig. 6 is a fragmentary elevation partly in section illustrating the manner in which one of the supporting springs is connected to one of the side rods of the mesh sections.

Referring to the accompanying drawings by numerals, it will be seen that the torpedo trap or guard is adapted to be positioned upon a ship 1 having the usual hull 2. Eyes 3 and 4 are carried by the hull 2 of the ship as shown in Fig. 2 and have nuts 5 carried upon the inner ends for positively holding the eyes 3 and 4 in fixed positions upon the hull 2. It is of course obvious that any other suitable means may be employed for retaining the eyes 3 and 4 upon the hull 2 in spaced relation and above the water line. It will also be noted that the ship 1 is provided with a plurality of windlasses 6 as shown in Fig. 1 for purposes to be hereinafter set forth.

The retaining links 7 have eyes 8 formed upon their inner ends and these eyes 8 engage eyes 3 carried upon the hull 2 of the ship 1 for pivotally supporting the inner ends of the retaining links 7. The outer ends of the links 7 are also provided with eyes 9 which engage the eyes 10 connected to the floats 11.

The float 11 is preferably cylindrical in cross section and elongated as illustrated clearly in Figs. 1, 3 and 4 and the eye 10 supported upon each float 11 has a head 12 formed upon its inner end thereby holding the eye 10 against displacement. It will be noted by referring particularly to Fig. 4 that the connection of the retaining link 7 to one of the floats 11 is below the water line. Thus the connection to the float will make an offcenter support so that when a sudden force of impact is imparted to the float the offcenter connection of the link 7 will cause the float to be moved downwardly for a predetermined distance.

The supporting arms 13 have heads 14 formed upon their inner ends and these heads 14 engage the inner surfaces of the tank as illustrated in Fig. 4 for holding the arms 13 in fixed positions. It is of course obvious that any other desired and suitable means may be employed for fixedly mounting the arms 13 upon the float 11 without departing from the spirit of this invention. These arms diverge toward their outer ends as illustrated in Fig. 2 where they terminate in eyes 15.

The mesh net comprises a plurality of sections each of which is formed of a pair of spaced rods constituting the upper rod 16 and the lower rod 17. These rods 16 and 17 are adapted to support the interwoven strands of mesh 18 while the rods 16 are provided with interlocking eyes 19 so as to permit the mesh to yield intermediate its ends thereby permitting the mesh net to always be adjacent the water line even when the surface of the water is very rough. The eyes 15 of the arms 13 engage the rods 16 and 17 of the mesh sections as shown in Figs. 2 and 3. In this manner it will be seen that the mesh will be in a separated condition owing to the diverging construction of the arms 13.

In order to yieldably support the mesh sections in a vertical plane coiled retaining springs 20 have their inner ends secured to the eyes 4 carried by the hull 2 of the ship 1, while the outer ends of the coiled retaining springs 20 are secured as shown at 21 to the upper rod 16. Owing to the resiliency of the coiled springs 20 it will be seen that the mesh sections will be held in a vertical plane. It is of course obvious that the guard will float adjacent the surface of the water owing to the supporting thereof by the floats 11. However in order to support the mesh sections in vertical planes the retaining springs 20 are employed as shown in Fig. 2.

Cables 22 have their outer ends engaging the upper rods 16 as shown at 23 while the opposite ends of the cables are connected to the windlasses 6 so that when so desired the windlasses which may be driven by any suitable motive power may unwind the cables 22 upon themselves thus causing the drawing inwardly of the cables 22 to lift the torpedo trap or guard completely from the water to a point adjacent the side of the ship when so desired.

When this torpedo trap or guard is in use it is lowered into the water as illustrated in Figs. 1 and 2. The net will be held at a spaced distance from the side of the hull 2 of the ship 1 owing to the fact that the retaining links will cause the floats to be spaced from the side of the hull. The floats however will hold the net adjacent the water line causing the net to project at substantially equal distances above and below the water line. The tension of the springs 20 will hold the net in a vertical position as hereinbefore set forth. The net is adapted to extend entirely around the ship so as to protect the ship from injury on both sides adjacent its ends and since the net is formed of a plurality of yieldable sections and that each section is independently supported with respect to these adjacent sections when the surface of the water is rough the independent sections will ride out of unison with each other so as to be at all times adjacent the water line. When a torpedo directed at the ship comes into engagement with the net, owing to the open construction of the net, the head of the torpedo will fit partially between the interwoven strands 18 of the net thus preventing the action of the usual firing pin of the torpedo, thus preventing the torpedo from being exploded. Furthermore in order to reduce the possibility of explosion of the torpedo the force of the impact of the torpedo with the net will cause the floats to be shoved inwardly toward the hull of the ship 2 and because of the offcenter support or engagement of the retaining links 7 as hereinbefore specified the floats will move inwardly and the links downwardly thus causing the net to yield before the torpedo which has just engaged the same. Of course this action increases the tension of the springs 20 while the downward movements of the links 7 are limited by the engagement of each link 7 with the slot lug 24 carried upon the hull 2 of the ship 1 in alinement with each link 7 and below the same as illustrated in Fig. 2. Thus even if the torpedo should explode due to the action of the firing pin squarely striking one of the springs and being actuated the torpedo would be held spaced from the side of the ship and although it would demolish a portion of the trap or guard, the ship would still be unharmed while the section of the trap or guard destroyed could be quickly and easily repaired.

From the foregoing description it will be seen that a very simple and efficient torpedo trap or guard has been produced which because of its sectional construction will float above the water line at all times even when the surface of the water is rough since the float of each section will hold the section adjacent the surface of the water and the retaining spring of each section will hold the section of the net in a vertical plane to engage a torpedo directed toward the ship. Furthermore by having the net yieldably supported in the manner above specified the possibility of the torpedo exploding is greatly reduced or if the torpedo should explode the holding thereof spaced from the ship will prevent the ship from being injured.

What is claimed, is;

1. In a torpedo trap or guard of the class described the combination of a ship, float means connected to said ship, guard means connected to said float means and means for yieldably retaining said guard means in a substantially vertical plane.

2. In a torpedo trap or guard the combination of a ship, float means movably connected to said ship, sectional guard means formed upon said float means and means yieldably retaining said guard means in substantially vertical planes.

3. In a torpedo trap or guard the combination of a ship, links pivotally mounted upon said ship, floats connected to said links, arms extending from said floats, a net carried by said arms and means for yieldably supporting said net in a vertical position.

4. In a torpedo trap or guard the combination of a ship, links pivotally mounted upon said ship, floats connected to said links, arms extending from said floats, a sectional net carried upon said arms and springs connected to said ship and to said sectional net for yieldably retaining the sectional net in a vertical plane.

5. In a torpedo trap or guard the combination of a ship, links pivotally mounted upon said ship, floats connected to said links by an offcenter connection, arms extending from said floats, guard means carried by said arms and means for yieldably retaining said guard means in a set position, said guard means being adapted to yield by the movement of said links because of the offcenter connection of said floats when an obstacle strikes said guard means.

6. In a torpedo trap or guard, the combination of a ship, links pivotally mounted upon said ship, floats connected to said links by an offcenter connection, arms extending from said floats, a sectional net connected to said arms, means for yieldably retaining said sectional net in a vertical plane whereby when an obstacle strikes said net the force thereof will cause the net to move inwardly as said links swing downwardly because of their offcenter connection to said floats after which said means will return said net to its normal position.

7. In a torpedo trap or guard the combination of a ship, links pivotally connected to said ship, floats connected to said links by an offcenter support, arms extending from said floats, a net carried upon said arms, coil springs connected to said ship and said net for yieldably retaining said net in a vertical plane, said springs being adapted to yield when an obstacle strikes said net thereby permitting said arms to swing and said net to move inwardly for taking up the force of the impact after which said springs will return said net to its normal position.

8. In a torpedo trap or guard the combination of a ship, links pivotally mounted upon said ship, tanks connected to said links by an offcenter connection, arms extending from said tanks, a net carried upon said arms, coiled springs carried by said ship and engaging said net for normally retaining said net in a vertical plane, stop lugs carried by said ship in line of movement of links whereby when an obstacle strikes said net and drives the same inwardly by the pivoting of the links, the movement of the said links in one direction will be stopped by said lugs after which said springs will return said net to its normal position whereby said net will at all times be spaced from the side of said ship.

9. In a torpedo trap and guard of the class described, the combination of a ship, links pivotally mounted upon said ship, floats connected to said links, diverging arms extending from said floats and guard means carried by said arms.

10. In a torpedo trap or guard of the class described, the combination of a ship, links pivotally mounted upon said ship, floats carried upon said links, diverging arms extending from said floats, a net carried by said arms whereby said net will be held in a taut condition and means for yieldably retaining said net in a set position.

11. In a torpedo trap or guard of the class described, the combination of a ship, links pivotally mounted upon said ship, floats connected to said links, arms fixed upon said floats and diverging therefrom, a net carried by said arms whereby said net will be held in a taut condition, coiled springs connected to said ship and engaging said net for normally holding the same in a vertical plane, said net being adapted to yield when an obstacle strikes the same.

12. In a torpedo trap or guard, the combination of a ship, floats connected to said ship, guard means connected to said floats, and means for yieldably retaining said guard means in a substantially vertical plane.

13. In a torpedo trap or guard, the combination of a ship, float means connected to said ship, nets connected to said float means, and means for yieldably retaining said nets in substantially vertical planes.

14. In a torpedo trap or guard, the combination of a ship, float means connected to said ship, nets connected to said float means, and springs connected to said nets for retaining said nets in substantially vertical planes.

15. In a torpedo trap or guard, the combination of a ship, float means connected to said ship, guard means connected to said float means, and springs connected to said guard means for holding said guard means in a substantially vertical plane.

16. In a torpedo trap or guard, the combination of a ship, floats movably connected to said ship, sectional guard means carried by said floats, and means yieldably retaining said guard means in substantially vertical planes.

17. In a torpedo trap or guard, the combination of a ship, float means movably connected to said ship, sectional nets carried by said float means, and means yieldably retaining said guard means in substantially vertical planes.

18. In a torpedo trap or guard, the combination of a ship, float means movably connected to said ship, sectional nets carried by said float means and springs connected to said ship and said nets for yieldably retaining said nets in substantially vertical planes.

19. In a torpedo trap or guard, the combination of a ship, float means connected to said ship, sectional guard means carried by said float means and springs yieldably retaining said guard means in substantially vertical planes.

20. In a torpedo trap or guard, the combination of a ship, links pivotally connected to said ship, floats connected to said links at offcenter points, and guard means carried by said floats, whereby when force of impact is imparted to said guard means, said guard means may move slightly toward said ship by sinking slightly against the buoyancy of said floats.

21. In a torpedo trap or guard, the combination of a ship, links pivotally connected to said ship, floats connected to said links at offcenter points, arms extending from said floats and nets carried by said arms.

22. In a torpedo trap or guard, the combination of a ship, links pivotally connected to said ship, floats connected to said links at offcenter points, diverging arms extending from said floats, nets carried by said arms, whereby said nets will be held in taut conditions.

23. In a torpedo trap or guard, the combination of a ship, links pivotally connected to said ship, floats connected to said links at offcenter points, diverging arms extending from said floats, nets carried by said arms, whereby said nets will be held in taut conditions, and means for holding said nets in substantially vertical planes.

24. In a torpedo trap or guard, the combination of a ship, links pivotally connected to said ship, floats connected to said links at offcenter points, diverging arms extending from said floats, nets carried by said arms, whereby said nets will be held in taut conditions, and springs carried by said ship and connected to said nets for holding the same in substantially vertical planes.

25. In a torpedo trap or guard, the combination of a ship, links pivotally mounted upon said ship, floats connected to said links by off-center connection, arms extending from said floats, nets carried by said arms, and means for retaining said nets in substantially vertical planes.

26. In a torpedo trap or guard, the combination of a ship, links pivotally mounted upon said ship, floats connected to said links by off-center connections, arms extending from said floats, nets carried by said arms, and springs carried by said ship and engaging said nets for holding the same in substantially vertical planes.

27. In a torpedo trap or guard, the combination of a ship, links pivotally mounted upon said ship, floats connected to said links by off-center connections, arms extending from said floats, guard means carried by said arms and springs carried by said ship and engaging said guard means for holding the same in substantially vertical planes.

In testimony whereof I hereunto affix my signature.

LOUIS EARL ARMSTRONG.

Copies of this patent may be obtained for five cents each, by addressing the "Commissioner of Patents, Washington, D. C."